(12) United States Patent
Scifres et al.

(10) Patent No.: US 11,190,369 B2
(45) Date of Patent: Nov. 30, 2021

(54) METHOD AND SYSTEM FOR JOINING AN ONLINE MEETING

(71) Applicant: SHARP NEC DISPLAY SOLUTIONS, LTD., Tokyo (JP)

(72) Inventors: Eric Scifres, Los Altos, CA (US); Priyanka Sanghvi, San Jose, CA (US); Dhana Dhanasarnsombat, San Jose, CA (US)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/832,444

(22) Filed: Mar. 27, 2020

(65) Prior Publication Data

US 2021/0306169 A1    Sep. 30, 2021

(51) Int. Cl.
*G06F 15/16* (2006.01)
*H04L 12/18* (2006.01)
*G06F 21/31* (2013.01)

(52) U.S. Cl.
CPC .......... *H04L 12/1822* (2013.01); *G06F 21/31* (2013.01); *H04L 12/1827* (2013.01)

(58) Field of Classification Search
CPC .. H04L 12/1822; H04L 12/1827; G06F 21/31
USPC ................................. 709/204, 205
See application file for complete search history.

(56) References Cited

U.S. PATENT DOCUMENTS

| | | | |
|---|---|---|---|
| 8,412,773 B1 * | 4/2013 | Chapweske | H04L 65/608 |
| | | | 709/205 |
| 2015/0348185 A1 * | 12/2015 | Frost | G06Q 40/02 |
| | | | 705/35 |
| 2016/0050160 A1 | 2/2016 | Li et al. | |
| 2016/0105472 A1 | 4/2016 | Chitroda et al. | |
| 2016/0112476 A1 | 4/2016 | Gudipaty et al. | |
| 2016/0134428 A1 | 5/2016 | Ouyang et al. | |
| 2016/0269203 A1 * | 9/2016 | Hinohara | H04N 7/152 |
| 2016/0277456 A1 | 9/2016 | Sallam | |
| 2016/0283909 A1 | 9/2016 | Adiga | |
| 2017/0346821 A1 * | 11/2017 | Yedidi | H04L 63/083 |
| 2019/0013956 A1 * | 1/2019 | Eda | H04L 12/1831 |
| 2019/0045036 A1 * | 2/2019 | Rahat | H04L 47/2483 |

* cited by examiner

*Primary Examiner* — Liang Che A Wang
(74) *Attorney, Agent, or Firm* — Sughrue Mion, PLLC

(57) ABSTRACT

A method includes permitting, by a server, a first device to join an online meeting held with at least a third device based on receiving a user input from the first device. The method includes permitting, by the server, a second device to join the online meeting in addition to the first device based on receiving login information associated with a user account used by the first device from the second device. The method includes providing, by the server and to at least the third device in the online meeting, screen information of the second device after permitting the second device to join the online meeting.

14 Claims, 10 Drawing Sheets

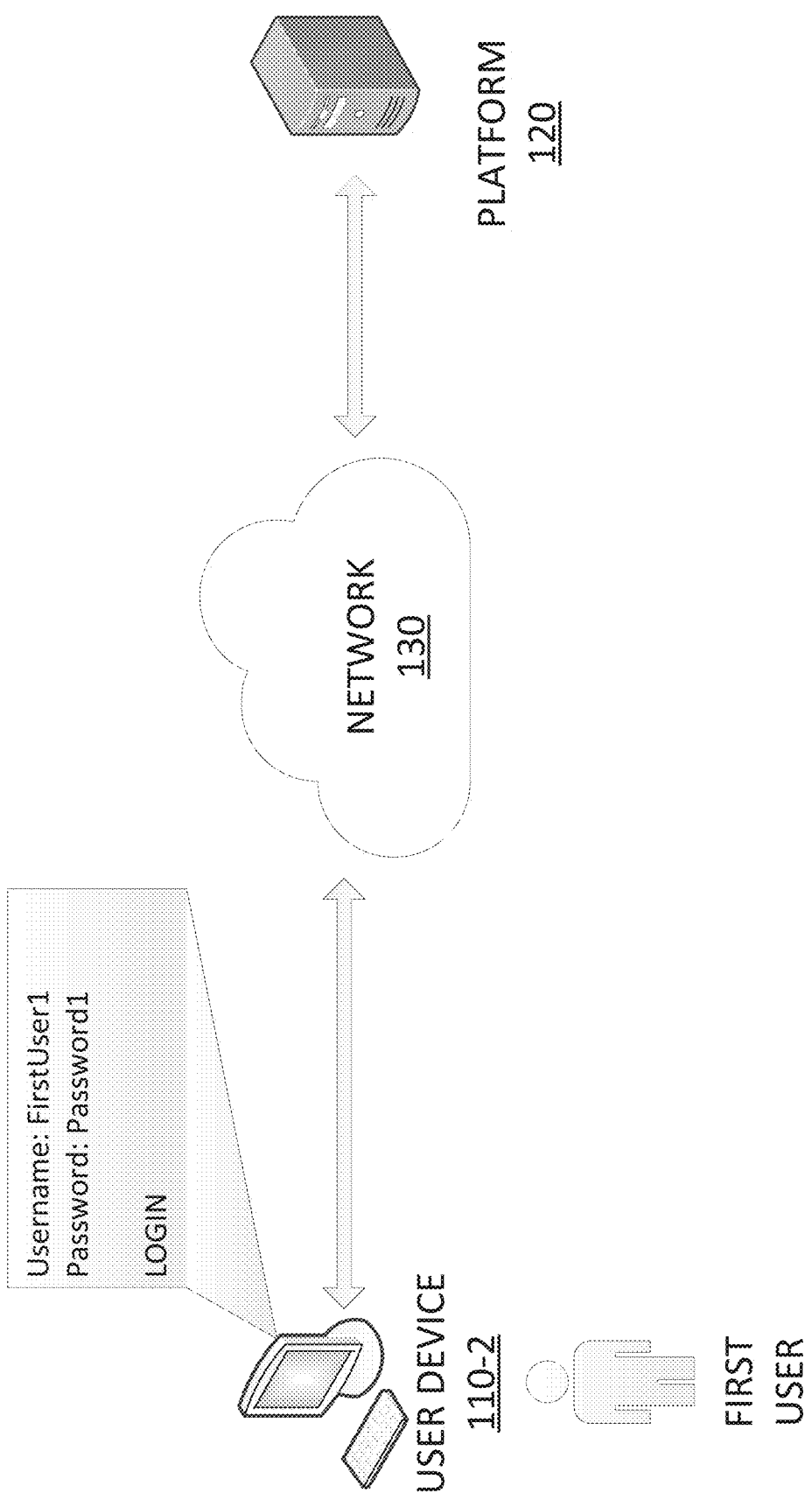

METHOD AND SYSTEM FOR JOINING AN ONLINE MEETING

FIELD

This disclosure relates to a method, a server, and a computer-readable medium. More particularly, the disclosure relates to a method, a server, and a computer-readable medium for permitting multiple devices to join an online session and simultaneously participate in the online session using the same underlying login information to conduct an online meeting.

BACKGROUND

A server may host a web conference that permits user devices to join the web conference. In this way, users can join the web conference, and interact with other users that have joined the web conference.

Typically, a user joins a web conference using a single user device, such as the user's mobile device, the user's desktop computer, the user's tablet computer, or the like. To do so, the user may input login information associated with a user account of the user into the user device. The user device may then transmit the login information to a server that is hosting the web conference. The server may receive the login information, perform authorization and/or authentication based on the login information and user account information, and permit the user device to join the web conference.

In some cases, a server hosting a web conference may prevent multiple user devices from joining the web conference using the same underlying login information. For instance, after joining a web conference using login information with a first user device, the user may input the login information into a second user device of the user if the user desires to join the web conference using the second user device of the user. In this case, the server may receive the login information from the second user device, determine that the login information matches login information of the first user device that is currently in the web conference, and remove the first user device from the web conference based on this determination. After removing the first user device from the web conference, the server may permit the second user device to join the web conference. In this way, the user may be incapable of simultaneously utilizing two user devices in a web conference using a single account.

In other cases, a server hosting a web conference may permit multiple user devices associated with a user to join the web conference. For instance, after joining a web conference using login information with a first user device, the user may interact with the second user device, and bring the first user device and the second user device within communicative proximity. Based on being within communicative proximity with the second user device, the first user device may provide a token to the second user device using short range communication. The first user device may also provide the token to the server. The second user device may then provide the token to the server hosting the web conference. The server may receive the token, compare the tokens received from the respective user devices, and permit the second user device to join the web conference based on the comparison. In this way, the user may utilize multiple user devices in a web conference. However, this technique requires that the user devices communicate with each other via direct communication, and exchange information, thereby increasing the susceptibility to security risks. Further, this technique requires the user to interact with multiple user devices and/or configure respective applications of the user devices, which may prove error prone, tedious, and/or time consuming.

SUMMARY

The present disclosure is directed to a method and system of joining an online meeting using the same underlying login information.

According to an aspect of the disclosure, a method may include permitting, by a server, a first device to join an online meeting held with at least a third device based on receiving a user input from the first device; permitting, by the server, a second device to join the online meeting in addition to the first device based on receiving login information associated with a user account used by the first device from the second device; and providing, by the server and to at least the third device in the online meeting, screen information of the second device after permitting the second device to join the online meeting.

According to an aspect of the disclosure, a server may include a memory that may store instructions, and a processor that may execute the instructions to permit a first device to join an online meeting held with at least a third device based on receiving a user input from the first device; permit a second device to join the online meeting in addition to the first device based on receiving login information associated with a user account used by the first device from the second device; and provide, to at least the third device in the online meeting, screen information of the second device, after permitting the second device to join the online meeting.

According to an aspect of the disclosure, a non-transitory computer-readable medium may store instructions including one or more instructions that, when executed by one or more processors of a device, may cause the one or more processors to: permit a first device to join an online meeting held with at least a third device based on receiving a user input from the first device; permit a second device to join the online meeting in addition to the first device based on receiving login information associated with a user account used by the first device from the second device; and provide, to at least the third device in the online meeting, screen information of the second device, after permitting the second device to join the online meeting.

BRIEF DESCRIPTION OF THE DRAWINGS

FIGS. 1A-1G are diagrams of an overview of an example implementation described herein;

DETAILED DESCRIPTION

Figure 1A:
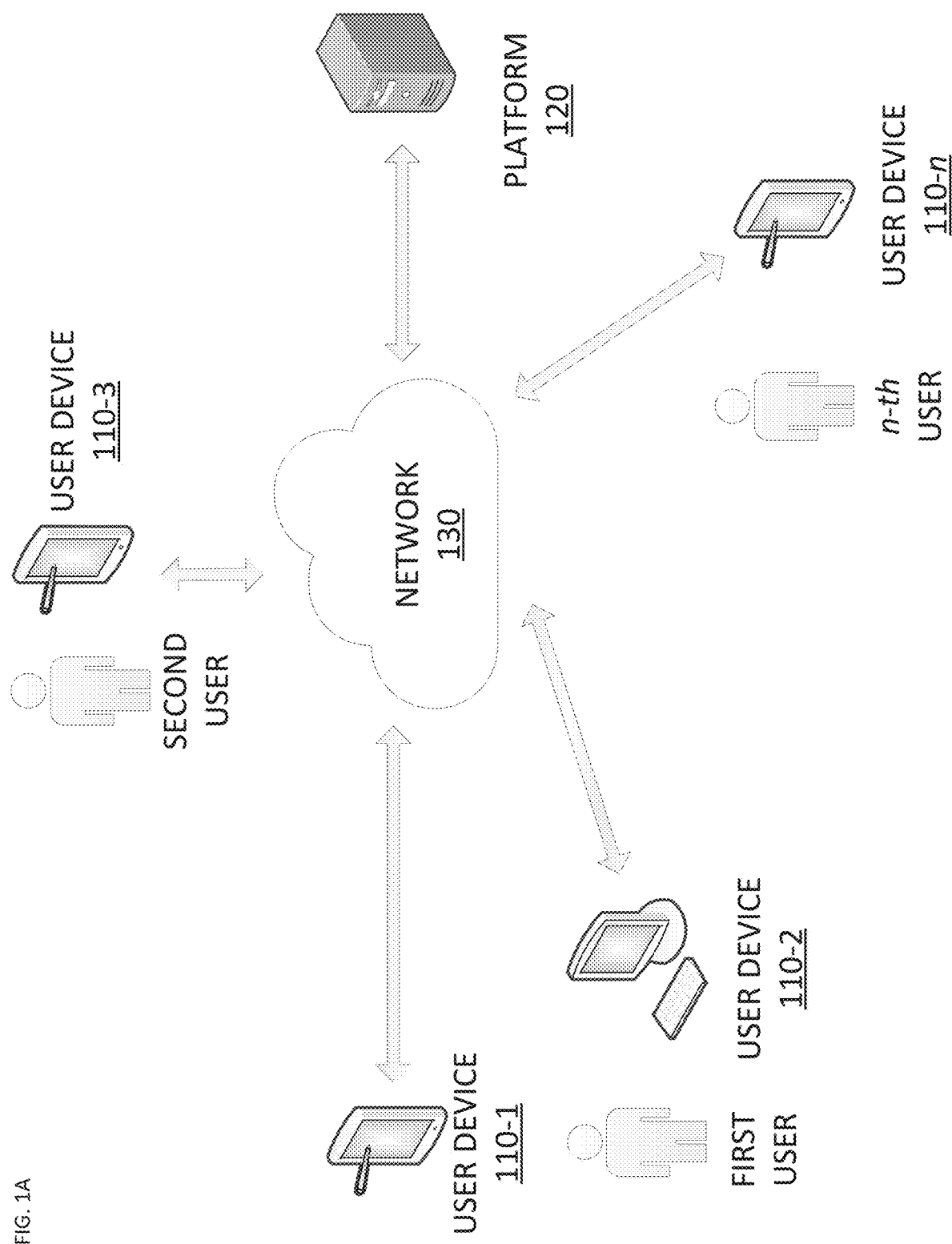

FIGS. 1A-1G are diagrams of an overview of an embodiment described herein. As shown in FIG. 1A, an example environment 100 may include user devices 110-1 through 110-n, a platform 120, and a network 130. The platform 120 may host an online session, and permit user devices 110-1 through 110-n to join the online session to conduct an online meeting.

As shown, a first user may be associated with user device 110-1 and user device 110-2, a second user may be associated with user device 110-3, and an n-th user may be associated with user device 110-n.

Each user may be associated with a respective user account for utilizing an online meeting application. Further, each user may be associated with respective login information for the online meeting application. As an example, each user may have a username and a password.

Figure 1B:
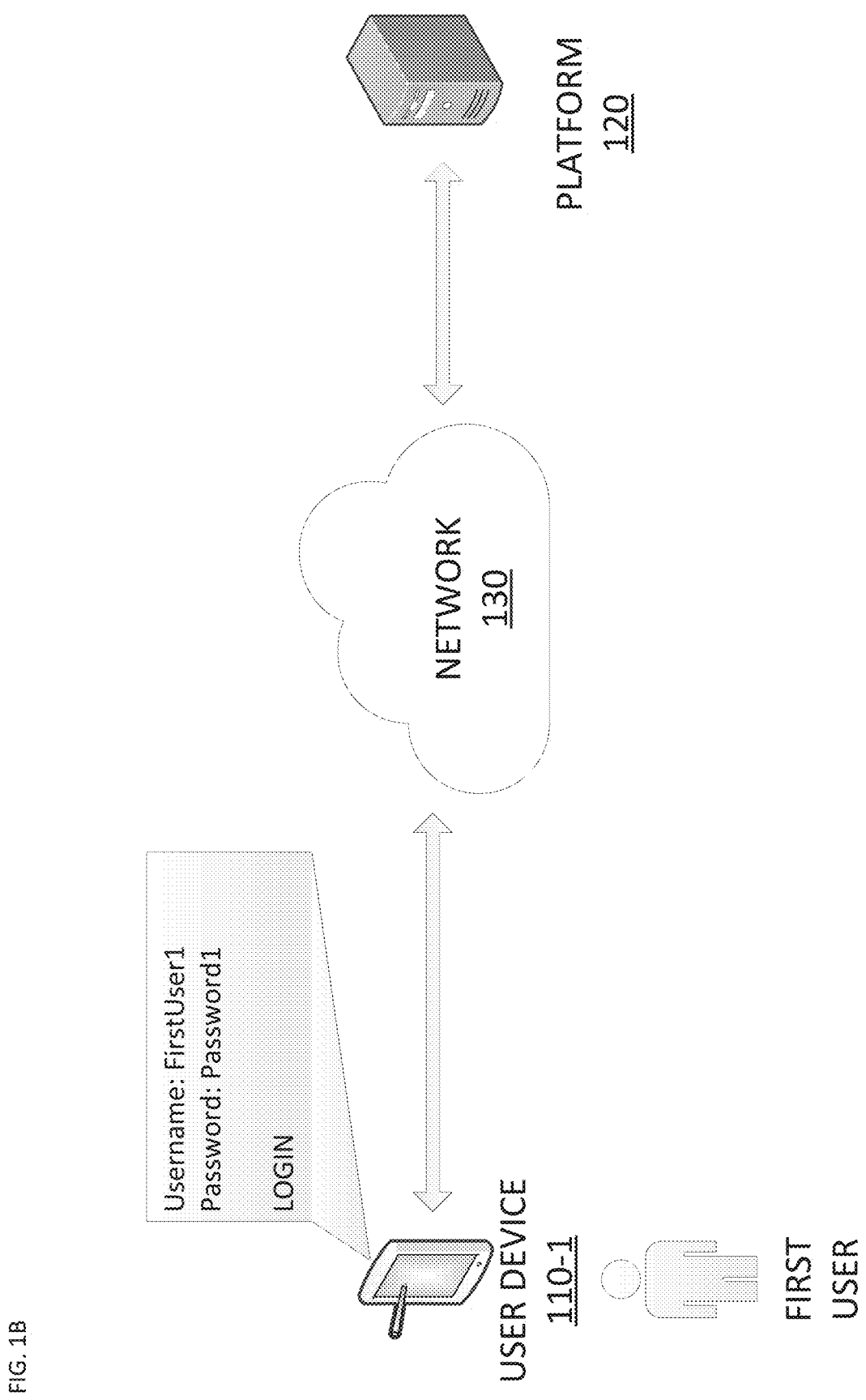

As shown in FIG. 1B, the first user may join the online session using the first user device 110-1 (e.g., a tablet computer). To do so, the first user may interact with the first user device 110-1 to execute the online meeting application. Based on executing the online meeting application, the first user device 110-1 may display a login screen. The first user may input login information such as the first user's username (e.g., "FirstUser1") and the first user's password (e.g., "Password1") into respective fields of the login screen, and select a login icon. The first user device 110-1 may transmit the login information to the platform 120.

Figure 1C:
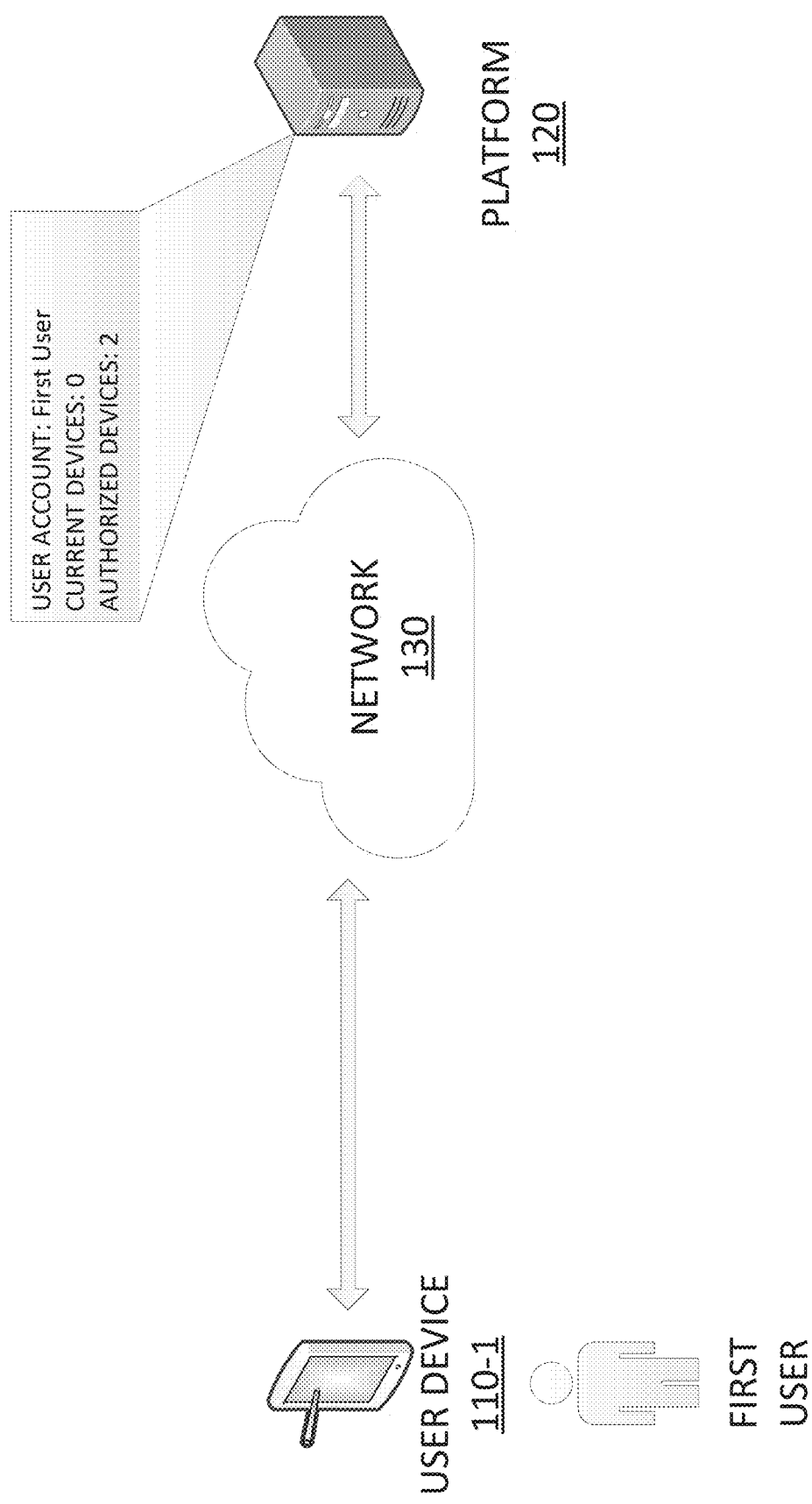

As shown in FIG. 1C, the platform 120 may store a data structure that includes user account information. For example, the data structure includes information identifying a user account (e.g., "First User"), a number of user devices associated with the user account that are currently in the online session (e.g., "CURRENT DEVICES: 0"), and a number of devices associated with the user account that are authorized to join the online session (e.g., "AUTHORIZED DEVICES: 2").

The platform 120 may receive the login information from the first user device 110-1, and permit the first user device 110-1 to join the online session based on the login information and the user account information. For example, the platform 120 may determine that the first user device 110-1 is authorized to join the online session based on determining that the login information matches authorization information associated with the user account. Further, the platform 120 may determine that a number of user devices associated with the user account that are currently in the online session (i.e., zero) is less than a number of devices associated with the user account that are authorized to join the online session (i.e., two).

Based on the foregoing, the platform 120 may permit the first user device 110-1 to join the online session. The platform 120 may update an entry for the user account associated with the first user based on the first user device 110-1 joining the online session. That is, the platform 120 may update the number of user devices associated with the user account of the first user that are currently in the online session to one.

Based on joining the online session, the first user device 110-1 may capture video information using a camera of the first user device 110-1, and provide the video information to the platform 120. For example, the first user may place the first user device 210-1 adjacent to a workspace of the first user, and the first user device 210-1 may capture video information of the first user while the first user is sitting at the first user's workspace.

The platform 120 may receive video information from user devices 110 that have joined the online session, and provide the video information to the user devices 110 to permit the respective user devices 110 to display the video information.

Figure 1D:
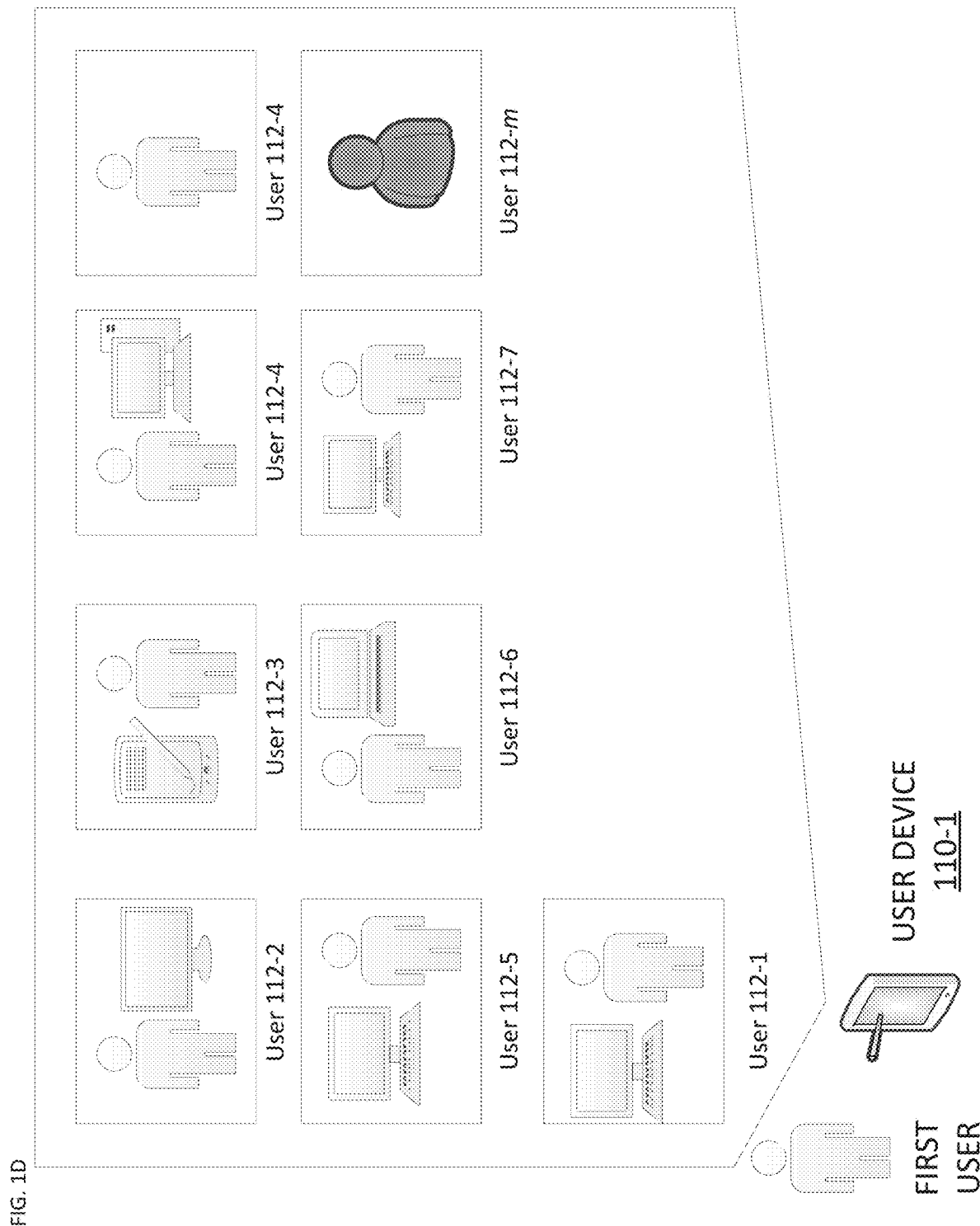

For example, as shown in FIG. 1D, the first user device 110-1 may display a set of windows that include respective video information associated with users in the online session (or that are permitted to join the online session). The first user device 110-1 may display a window 112-1 that includes the video information captured by the first user device 110-1, and display windows 112-2 through 112-m associated with users in the online session (or that are permitted to join the online session). The user devices 110 of the other participants in the online session may display video streams in a similar manner.

In this way, the first user may utilize with the first user device 110-1 to interact with other users in the online session to conduct an online meeting. For example, the first user may select a particular displayed window to interact with a particular other user in the online session. As examples, the first user may send text, video, and/or audio information to another user device in the online session; may initiate a call with another user device, may send a notification to another user device; may request another user device to join the online session; may view the video feed of the other user; or the like.

After joining the online session with the first user device 110-1, the first user may join the online session with a second user device 110-2 of the first user. For example, as shown in FIG. 1E, the first user may join the online session using the second user device 110-2 (e.g., a desktop computer). To do so, the first user may interact with the second user device 110-2 to execute the online meeting application. Based on executing the online meeting application, the second user device 110-2 may display a login screen. The first user may input login information such as the first user's username (e.g., "FirstUser1") and the first user's password (e.g., "Password1") into respective fields of the login screen, and select a join icon. The second user device 110-2 may transmit the login information to the platform 120. As shown, the login information is the same login information that was used to join the first user device 110-1 in the online session.

Figure 1F:
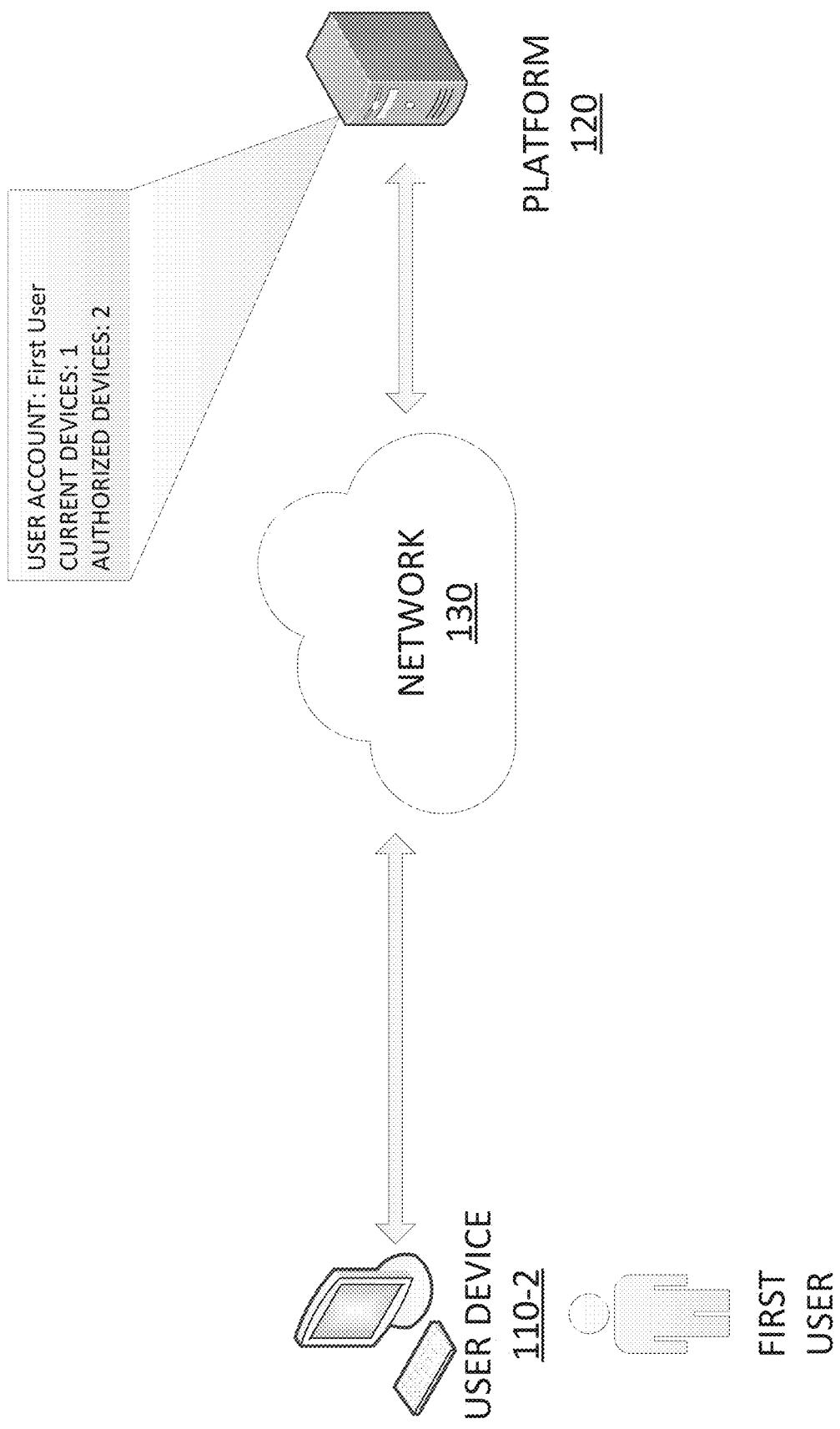

As shown in FIG. 1F, the platform 120 may receive the login information from the second user device 110-2, and permit the second user device 110-2 to join the online session based on the login information and the authorization information. For example, as shown, the platform 120 may determine that the second user device 110-2 is authorized to join the online meeting based on determining that the login information matches the authorization information. Further, the platform 120 may determine that a number of user devices associated with the user account that are currently in the online session (i.e., one) is less than a number of devices associated with the user account that are authorized to join the online session (i.e., two).

Based on the foregoing, the platform 120 may permit the second user device 110-2 to join the online session. The platform 120 may update an entry for the user account associated with the first user based on the second user device 110-1 joining the online session. That is, the platform 120 may update the number of user devices associated with the user account of the first user that are currently in the online session to two.

Figure 1G:
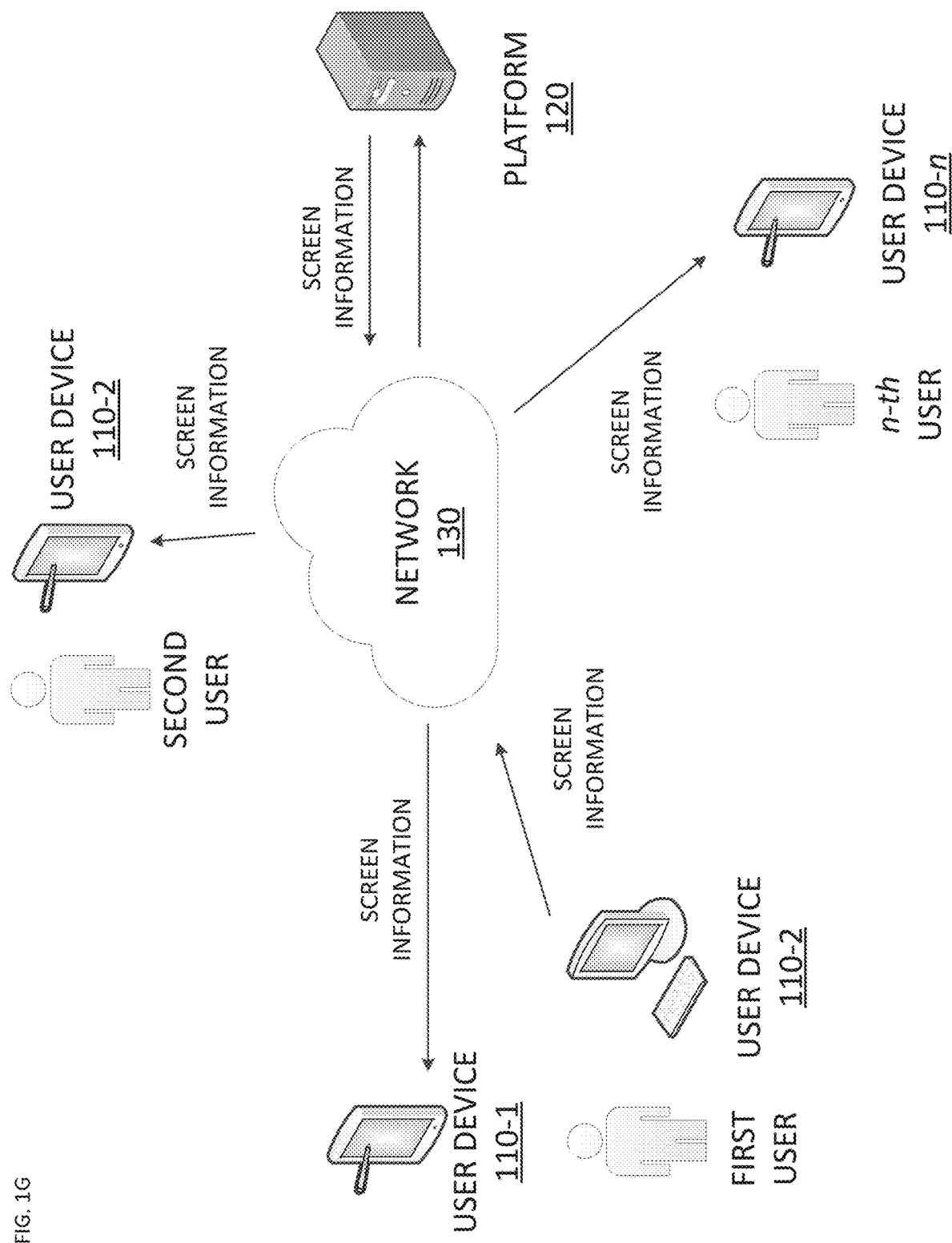

After joining the online session with both devices, the first user may use the first user device 110-1 to view a video stream from each of the participants in the online session, and use the second user device 110-2 to display documents and share the screen of the second user device 110-2 with the other participants. That is, the first user may interact with the second user device 110-2 to share a screen of the second user device 110-2 with other users in the online session. For example, as shown in FIG. 1G, the platform 120 may receive screen information from the second user device 110-2, and provide the screen information to the other user devices 110 that are joined in the online session.

In this way, the first user may interact with the first user device 110-1 and the second user device 110-2 to separately join a same underlying online session using the same underlying login information. Further, in this way, the first user device 110-1 and the second user device 110-2 may simultaneously access an online session without requiring that the first user device 110-1 and the second user device 110-2 communicate with each other via a direct communication, such as via a short range communication protocol. In this way, security may be enhanced, and computational resources associated with joining an online session may be conserved.

Figure 2:
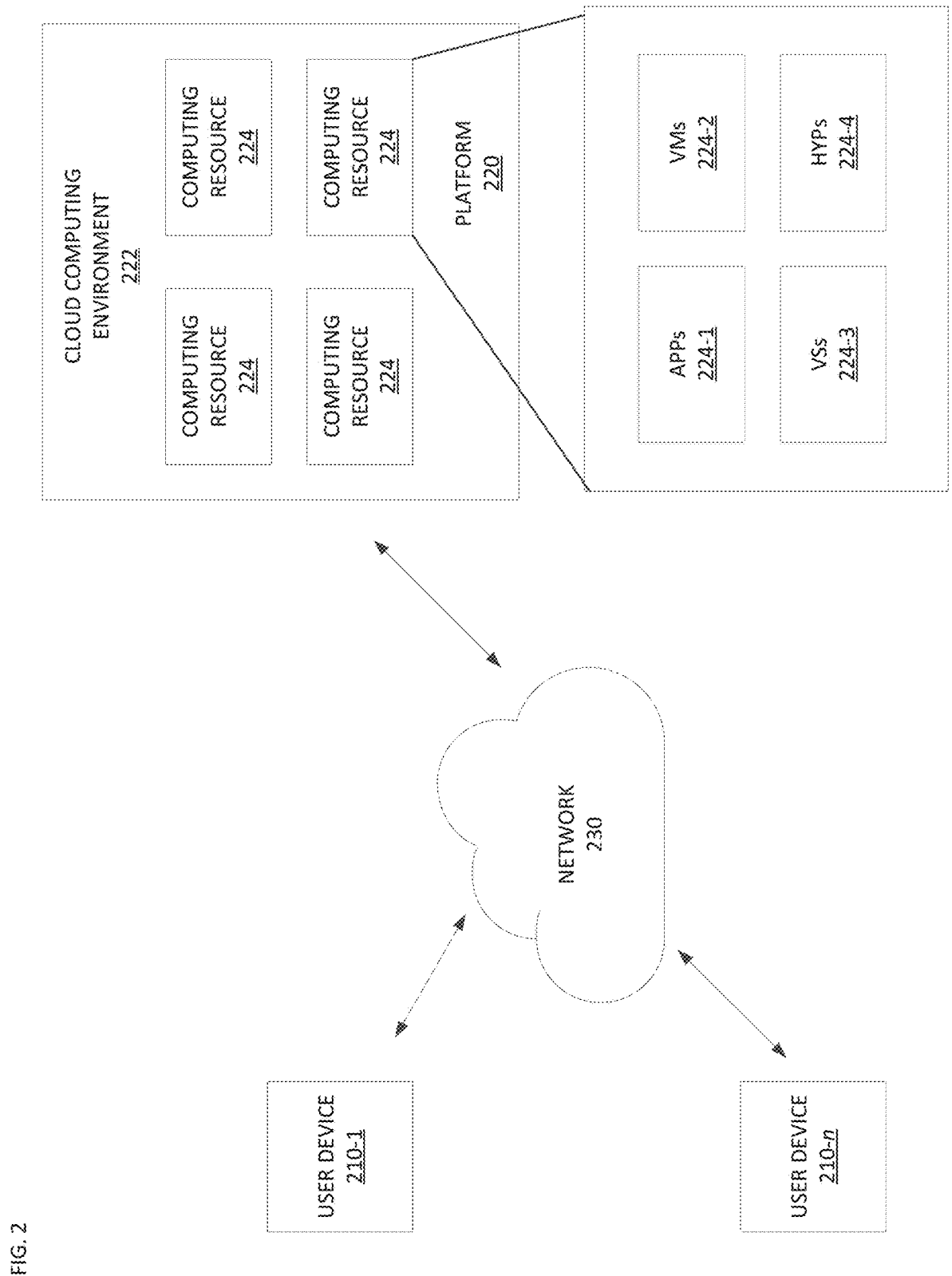
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a first user device 210-1, an n-th user device 210-n, a platform 220, and a network 230. Devices of environment 200 may interconnect via wired connections, wireless connections, or a combination of wired and wireless connections.

First user device 210-1 includes one or more devices capable of receiving, generating, storing, processing, and/or providing information associated with an online session. For example, first user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, first user device 210 may receive information from and/or transmit information to platform 220.

n-th user device 210-n includes one or more devices capable of receiving, generating, storing, processing, and/or providing information associated with an online session. For example, n-th user device 210-n may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, n-th user device 210-n may receive information from and/or transmit information to platform 220.

The first user device 210-1 and the n-th user device 210-n may be associated with a same user account. That is, a particular user may utilize the first user device 210-1 and the n-th user device 210-n. Although implementations herein describe a user as joining an online session using two user devices 210, it should be understood that the user may join an online session using any number of user devices 210.

Platform 220 includes one or more devices capable of hosting an online session as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., the first user device 210-1 and the n-th user device 210-n) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by the first user device 210-1 and the n-th user device 210-n. Application 224-1 may eliminate a need to install and execute the software applications on the first user device 210-1 and the n-th user device 210-n. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., the first user device 210-1 and the n-th user device 210-n), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
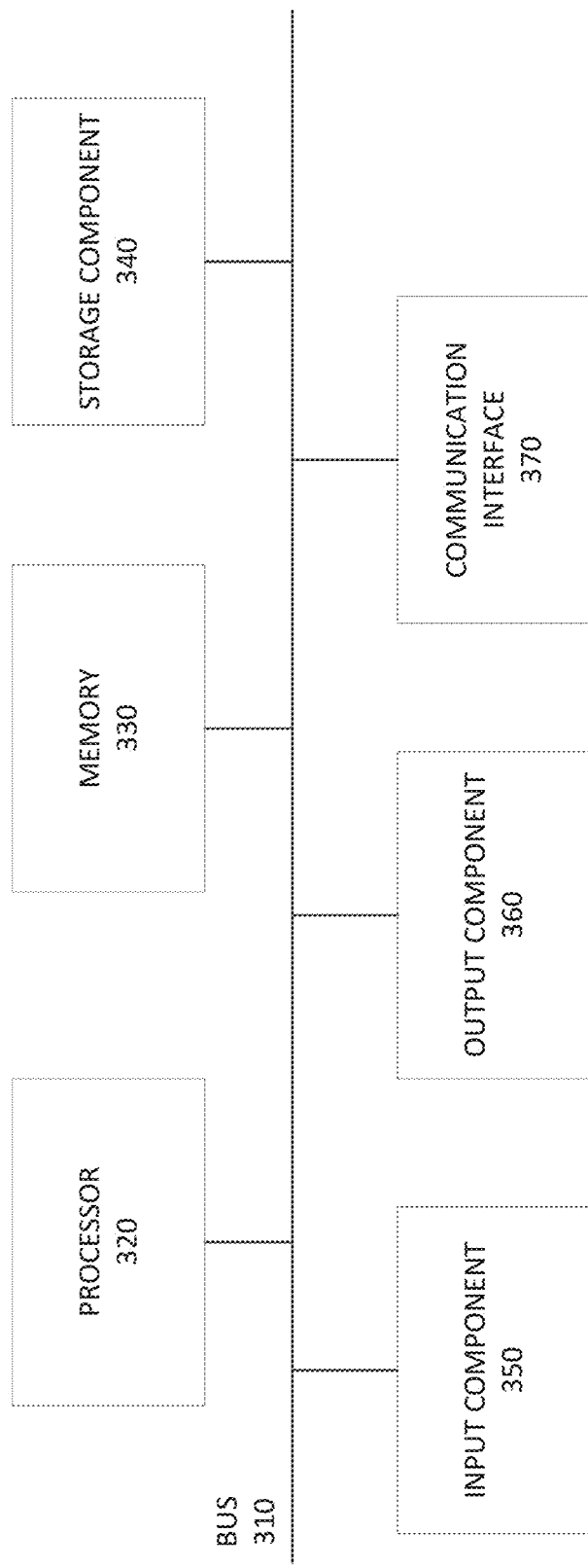
FIG. 3 is a diagram of example components of one or more devices of FIG. 2.

FIG. 3 is a diagram of example components of a device 300. Device 300 may correspond to the first user device 210-1, the n-th user device 210-*n*, and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
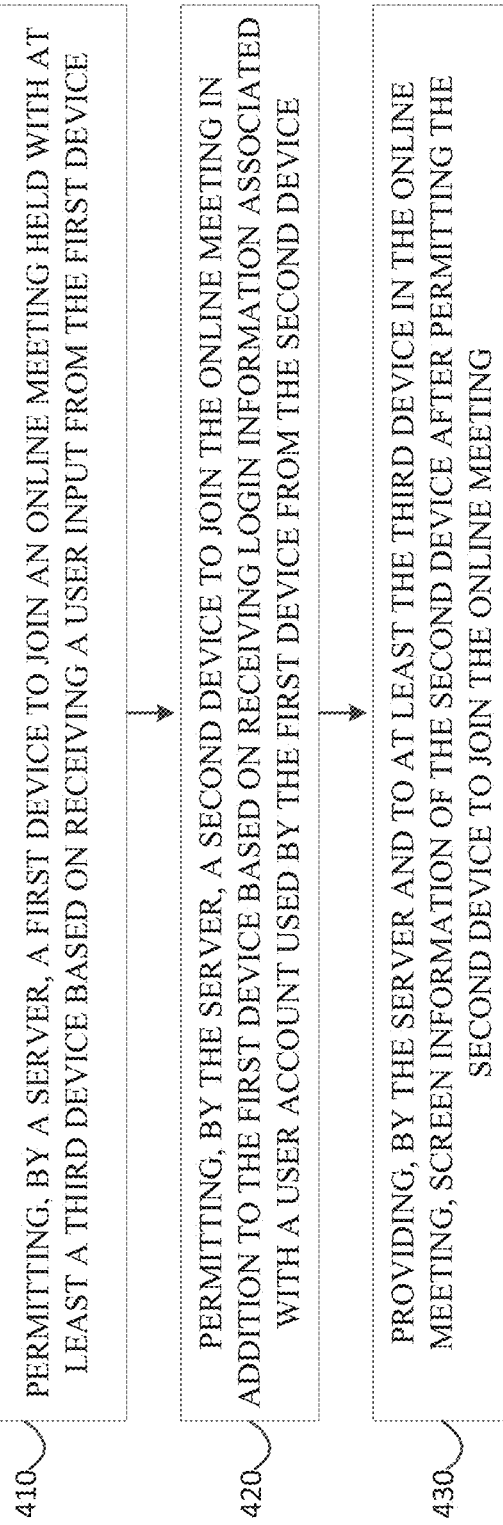
FIG. 4 is a flow chart of an example process for joining an online meeting.

FIG. 4 is a flow chart of an example process 400 for joining an online session. In some implementations, one or more process blocks of FIG. 4 may be performed by platform 220. In some implementations, one or more process blocks of FIG. 4 may be performed by another device or a group of devices separate from or including platform 220, such as the first user device 210-1 or the n-th user device 210-*n*.

As shown in FIG. 4, process 400 may include permitting, by a server, a first device to join an online meeting held with at least a third device based on receiving a user input from the first device (block 410). For example, platform 220 may permit the first user device 210-1 to join an online meeting based on receiving login information associated with a user account from the first user device 210-1.

The online session may refer to a temporary and interactive information exchange between two or more devices. The platform 220 may establish and host the online session between user devices 210-1 through 210-n to permit user devices 210-1 through 210-n to exchange data.

A user device 210 may join the online session, and display a home screen based on joining the online session. The home screen may identify other users that have joined the online session. As an example, the home screen may display a set of windows, and each window may correspond to a particular user that has joined the online session. Further, a window may display video information of a user that is captured by a user device 210 of the user. In this way, the home screen may display a set of windows that each include respective real-time video information of the users that have joined the online session. The user device 210 may display the home screen with low volume or no volume for the respective video information.

The online meeting may be any type of meeting facilitated by an underlying online session of an online collaboration service that permits a user device 210 to send and receive information (e.g., text information, audio information, and/or video information) to other user device(s) 210 that have joined the online session. For example, the online meeting may be a web conference, a webcast, a peer-to-peer meeting, or the like.

A user device 210 that has joined the online session may join an online meeting with one or more other user devices 210 that have joined the online session. For example, a user may select one or more other users to conduct an online meeting, and the user device 210 may create or join an online meeting with one or more other user devices 210 corresponding to the one or more other users. The user device 210 may display a meeting screen along with volume corresponding to microphone inputs of the other user devices 210 that have joined the online meeting.

The online meeting may be started and ended. For example, the online meeting may be associated with a start time, and may be associated with an end time. In this way, the online meting may be associated with a timeframe delineated by the start time and the end time of the online meeting.

User device 210 may schedule the online meeting, cause the online meeting to be started, cause the online meeting to be ended, invite other user devices 210 to the online meeting, etc. In any event, user devices 210 may join the online session, and then may conduct an online meeting using the underlying online session.

The user account may include user account information associated with an account identifier, a username, a password, a user identifier (e.g., a given name, a surname, a nickname, etc.), a device identifier (e.g., an Internet Protocol (IP) address, a Media Access Control (MAC) address, etc.), a credential, a security policy, or the like. The platform 220 may store, or access, the user account, and may utilize information associated with the user account to authenticate the first user device 210-1, authorize the first user device 210-1, and/or permit the first user device 210-1 to join the online session.

The login information may include information that permits a user to access the user account. For example, the login information may include an account identifier, a user identifier, a device identifier, a password, a token, a key, or the like.

The platform 220 may execute a software application that permits the platform 220 to host an online session. In this case, the platform 220 may receive login information associated with a user account from the first user device 210-1 in order to permit the user device 210-1 to join the online session hosted by the platform 220.

Alternatively, the platform 220 may execute a software application that permits the platform 220 to interface with another device that hosts the online session. In this case, the platform 220 may receive login information associated with a user account from the first user device 210-1 in order to permit the user device 210-1 to join the online session hosted by the other device. That is, the platform 220 may act as an intermediary between the device hosting the online session and the first user device 210-1.

In any event, a user may interact with the first user device 210-1 to cause the first user device 210-1 to execute a software application that permits the first user device 210-1 to join the online session. The first user device 210-1 may display information that permits the user to input the login information. The user may input the login information, and cause the first user device 210-1 to provide the login information to the platform 220.

The platform 220 may receive the login information from the user device 210, and may identify user account information associated with the user device 210 based on the login information. Further, the platform 220 may authenticate and/or authorize the first user device 210-1 to join the online session based on the user account information.

The platform 220 may store a data structure that includes information identifying a number of devices associated with a user account that are authorized to simultaneously be joined in an online session ("authorized number"), and information identifying a number of devices associated with the user account that are currently joined in an online session ("current number").

The platform 220 may permit the first user device 210-1 to join the online session based on comparing the current number with the authorized number. For example, the platform 220 may permit the first user device 210-1 to join the online session based on determining that the current number is less than the authorized number.

The platform 220 may permit the first user device 210-1 to join the online session, and may update the current number based on permitting the first user device 210-1 to join the online session. That is, the platform 220 may increment the current number by one.

As further shown in FIG. 4, process 400 may include permitting, by the server, a second device to join the online meeting in addition to the first device based on receiving login information associated with a user account used by the first device from the second device (block 420).

For example, platform 220 may permit the n-th user device 210-n to join the online session in addition the first user device 210-1 based on receiving the login information associated with the user account from the n-th user device 210-n.

The online meeting may be held with one or more user devices 210 joined in the online session. The platform 220 may permit the first user device 210-1 to join the online session based on receiving the login information associated with the user account. The platform 220 may permit the n-th user device 210-n to join the online session based on receiving the login information when the n-th user device 210-n is permitted to join the online meeting. For example, the n-th user device 210-n may be permitted to join the online meeting while the online is being currently held. That is, the n-th user device 210-n may be permitted to join the online meeting during the timeframe associated with the online meeting.

The platform 220 may prevent the n-th user device 210-*n* from joining the online meeting. For example, the platform 220 may prevent the n-th user device 210-*n* from joining the online session if the online meeting is over. That is, the platform 220 may prevent the n-th user device 210-*n* from joining the online session based on a current time not coinciding with a timeframe of the online meeting.

The platform 220 may permit the first user device 210 to remain in the online session after the online meeting is over. In this way, the platform 220 may permit the first user device 210 to remain in the online session regardless of the timeframe of the online meeting, and may permit the n-th user device 210-*n* to join the online session only during the timeframe of the online meeting.

After joining the online session using the first user device 210-1, the user may interact with the n-th user device 210-*n* to cause the n-th user device 210-*n* to execute the software application that permits the n-th user device 210-*n* to join the online session. The n-th user device 210-*n* may display information that permits the user to input the login information. The user may input the login information, and cause the n-th user device 210-*n* to provide the login information to the platform 220. The user may input the same login information that was input to the first user device 210-1. For example, if the user input a username and a password into the first user device 210-1 to log in to the online session, then the user may input the username and the password into the the n-th user device 210-*n* to log in to the online session.

The platform 220 may receive the login information from the n-th user device 210-*n*, and may identify user account information associated with the n-th user device 210-*n* based on the login information. Further, the platform 220 may authenticate and/or authorize the n-th user device 210-*n* to join the online session based on the user account information.

The platform 220 may permit the n-th user device 210-*n* to join the online session based on comparing the current number with the authorized number. For example, the platform 220 may permit the n-th user device 210-*n* to join the online session based on determining that the current number is less than the authorized number.

The platform 220 may permit the n-th user device 210-*n* to join the online session, and may update the current number based on permitting the n-th user device 210-*n* to join the online session. That is, the platform 220 may increment the current number by one.

In this way, the first user device 210-1 and the n-th user device 210-*n* may be simultaneously joined in the online session by separately providing the same underlying log in information to the platform 220. Further, in this way, the first user device 210-1 and the n-th user device 210-*n* might not be required to perform direct communication to permit the n-th user device 210-*n* to join the online session. In this way, some implementations improve security and reduce the amount of computational resources needed to join devices to an online session.

As further shown in FIG. 4, process 400 may include providing, by the server and to at least the third device in the online meeting, screen information of the second device after permitting the second device to join the online meeting (block 430).

For example, the platform 220 may provide, to a plurality of user devices 210 in the online session, screen information of the n-th user device 210-*n*, based on permitting the n-th user device 210-*n* to join the online session with the first user device 210-1. The platform 220 may provide the screen information to at least a third user device 210.

The first user device 210 may provide information to the platform 220, and the platform 220 may provide the information to other devices in the online session. For example, the first user device 210-1 may provide video information captured by a camera of the first user device 210-1 to the platform 220, and the platform 220 may provide the video information to other devices in the online session. In this way, the first user device 210-1 may display a set of windows including respective video information of other users in the online session. Further, the other devices may display a set of windows, one of which includes the video information captured by the first user device 210-1.

The n-th user device 210-*n* may provide screen information to the platform 220, and the platform 220 may provide the screen information to the other devices in the online session. In this way, the platform 220 may receive various information associated with a same underlying user from the first user device 210-1 and the n-th user device 210-*n*, and provide the information to other devices of other participants in the online session.

Although particular implementations are described herein, it should be understood that any other types of information may be provided by the first user device 210-1 and the n-th user device 210-*n*.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Note that all the exemplary embodiments described herein are mere examples of embodiments that implement the disclosed features, and the technical scope of the disclosure should not be construed in a limiting sense by these exemplary embodiments. That is, the disclosure can be implemented in various forms without departing from the technical concept thereof or the primary features thereof.

SUPPLEMENTAL NOTE 1

A method comprising:
permitting, by a server, a first device to join an online meeting held with at least a third device based on receiving a user input from the first device;
permitting, by the server, a second device to join the online meeting in addition to the first device based on receiving login information associated with a user account used by the first device from the second device; and
providing, by the server and to at least the third device in the online meeting, screen information of the second device after permitting the second device to join the online meeting.

SUPPLEMENTAL NOTE 2

The method of SUPPLEMENTAL NOTE 1, further comprising:
permitting, by the server, the first device to join an online session based on receiving the login information associated with the user account, wherein the online meeting is held with one or more devices joined in the online session.

SUPPLEMENTAL NOTE 3

The method of SUPPLEMENTAL NOTE 2, further comprising: permitting, by the server, the second device to join the online session based on receiving the login information when the second device is permitted to join the online meeting; and
preventing, by the server, the second device from joining the online session if the online meeting is over, wherein the first device is joined in the online session after the online meeting is over.

SUPPLEMENTAL NOTE 4

The method of SUPPLEMENTAL NOTE 1, further comprising: providing, by the server, video information captured by a camera of the first device to other devices joined in the online session; and
permitting, by the server, the second device to join the online meeting only if the first device is joined in the online meeting.

SUPPLEMENTAL NOTE 5

The method of SUPPLEMENTAL NOTE 1, further comprising:
determining, by the server, that a number of devices associated with the user account that are currently joined in the online meeting is less than a threshold,
wherein permitting the second device to join the online meeting comprises permitting the second device to join the online meeting based on determining that the number of devices associated with the user account is less than the threshold.

SUPPLEMENTAL NOTE 6

The method of SUPPLEMENTAL NOTE 1, further comprising:
updating, by the server, a number of devices associated with the user account that are currently joined in the online meeting based on permitting the first device to join the online meeting, and based on permitting the second device to join the online meeting.

SUPPLEMENTAL NOTE 7

The method of SUPPLEMENTAL NOTE 1, further comprising:
receiving, by the server, a username and a password from the first device as the login information; and
receiving, by the server, the username and the password from the second device as the login information.

SUPPLEMENTAL NOTE 8

A server comprising:
a memory configured to store instructions; and
a processor configured to execute the instructions to:
  permit a first device to join an online meeting held with at least a third device based on receiving a user input from the first device;
  permit a second device to join the online meeting in addition to the first device based on receiving login information associated with a user account used by the first device from the second device; and
  provide, to at least the third device in the online meeting, screen information of the second device, after permitting the second device to join the online meeting.

SUPPLEMENTAL NOTE 9

The server of SUPPLEMENTAL NOTE 8, wherein the processor is further configured to:
permit the first device to join an online session based on receiving the login information associated with the user account, wherein the online meeting is held with one or more devices joined in the online session.

SUPPLEMENTAL NOTE 10

The device of SUPPLEMENTAL NOTE 9, wherein the processor is further configured to:
permit the second device to join the online session based on receiving the login information when the second device is permitted to join the online meeting; and
prevent the second device from joining the online session if the online meeting is over, wherein the first device is joined in the online session after the online meeting is over.

SUPPLEMENTAL NOTE 11

The device of SUPPLEMENTAL NOTE 8, wherein the processor is further configured to:
provide video information captured by a camera of the first device to other devices joined in the online session; and permit the second device to join the online meeting only if the first device is joined in the online meeting.

SUPPLEMENTAL NOTE 12

The device of SUPPLEMENTAL NOTE 8, wherein the processor is further configured to:
determine that a number of devices associated with the user account that are currently joined in the online meeting is less than a threshold,
wherein the processor, when permitting the second device to join the online meeting, is configured to permit the second device to join the online meeting based on determining that the number of devices associated with the user account is less than the threshold.

SUPPLEMENTAL NOTE 13

The device of SUPPLEMENTAL NOTE 8, wherein the processor is further configured to:
update a number of devices associated with the user account that are currently joined in the online meeting based on permitting the first device to join the online meeting, and based on permitting the second device to join the online meeting.

SUPPLEMENTAL NOTE 14

The device of SUPPLEMENTAL NOTE 8, wherein the processor is further configured to:
receive a username and a password from the first device as the login information; and
receive the username and the password from the second device as the login information.

SUPPLEMENTAL NOTE 15

A non-transitory computer-readable medium storing instructions, the instructions comprising: one or more instructions that, when executed by one or more processors of a device, cause the one or more processors to:
permit a first device to join an online meeting held with at least a third device based on receiving a user input from the first device;
permit a second device to join the online meeting in addition to the first device based on receiving login information associated with a user account used by the first device from the second device; and
provide, to at least the third device in the online meeting, screen information of the second device, after permitting the second device to join the online meeting.

SUPPLEMENTAL NOTE 16

The non-transitory computer-readable medium of SUPPLEMENTAL NOTE 15, wherein the one or more instructions cause the one or more processors to:
permit the first device to join an online session based on receiving the login information associated with the user account, wherein the online meeting is held with one or more devices joined in the online session.

SUPPLEMENTAL NOTE 17

The non-transitory computer-readable medium of SUPPLEMENTAL NOTE 16, wherein the one or more instructions cause the one or more processors to:

permit the second device to join the online session based on receiving the login information when the second device is permitted to join the online meeting; and
prevent the second device from joining the online session if the online meeting is over, wherein the first device is joined in the online session after the online meeting is over.

SUPPLEMENTAL NOTE 18

The non-transitory computer-readable medium of SUPPLEMENTAL NOTE 15, wherein the one or more instructions cause the one or more processors to:
provide video information captured by a camera of the first device to other devices joined in the online session; and
permit the second device to join the online meeting only if the first device is joined in the online meeting.

SUPPLEMENTAL NOTE 19

The non-transitory computer-readable medium of SUPPLEMENTAL NOTE 15, wherein the one or more instructions cause the one or more processors to:
determine that a number of devices associated with the user account that are currently joined in the online meeting is less than a threshold,
wherein the one or more instructions, that cause the one or more processors to permit the second device to join the online meeting, cause the one or more processors to permit the second device to join the online meeting based on determining that the number of devices associated with the user account is less than the threshold.

SUPPLEMENTAL NOTE 20

The non-transitory computer-readable medium of SUPPLEMENTAL NOTE 15, wherein the one or more instructions cause the one or more processors to:
update a number of devices associated with the user account that are currently joined in the online meeting based on permitting the first device to join the online meeting, and based on permitting the second device to join the online meeting.

What is claimed is:
1. A method comprising:
permitting, by a server, a first device to join an online meeting held with at least a third device based on receiving a user input from the first device;
permitting, by the server, a second device to join the online meeting in addition to the first device based on receiving login information associated with a user account used by the first device from the second device;
providing, by the server and to at least the third device in the online meeting, screen information of the second device after permitting the second device to join the online meeting;
permitting, by the server, the first device to join an online session based on receiving the login information associated with the user account, wherein the online meeting is held with one or more devices joined in the online session;
providing, by the server, video information captured by a camera of the first device to other devices joined in the online session; and
permitting, by the server, the second device to join the online meeting only if the first device is joined in the online meeting.

2. The method of claim 1, further comprising:
- permitting, by the server, the second device to join the online session based on receiving the login information when the second device is permitted to join the online meeting; and
- preventing, by the server, the second device from joining the online session if the online meeting is over, wherein the first device is joined in the online session after the online meeting is over.

3. The method of claim 1, further comprising:
- determining, by the server, that a number of devices associated with the user account that are currently joined in the online meeting is less than a threshold,
- wherein permitting the second device to join the online meeting comprises permitting the second device to join the online meeting based on determining that the number of devices associated with the user account is less than the threshold.

4. The method of claim 1, further comprising:
- updating, by the server, a number of devices associated with the user account that are currently joined in the online meeting based on permitting the first device to join the online meeting, and based on permitting the second device to join the online meeting.

5. The method of claim 1, further comprising:
- receiving, by the server, a username and a password from the first device as the login information; and
- receiving, by the server, the username and the password from the second device as the login information.

6. A server comprising:
- a memory configured to store instructions; and
- a processor configured to execute the instructions to:
  - permit a first device to join an online meeting held with at least a third device based on receiving a user input from the first device;
  - permit a second device to join the online meeting in addition to the first device based on receiving login information associated with a user account used by the first device from the second device;
  - provide, to at least the third device in the online meeting, screen information of the second device, after permitting the second device to join the online meeting;
  - permit the first device to join an online session based on receiving the login information associated with the user account, wherein the online meeting is held with one or more devices joined in the online session;
  - provide video information captured by a camera of the first device to other devices joined in the online session; and
  - permit the second device to join the online meeting only if the first device is joined in the online meeting.

7. The server of claim 6, wherein the processor is further configured to:
- permit the second device to join the online session based on receiving the login information when the second device is permitted to join the online meeting; and
- prevent the second device from joining the online session if the online meeting is over, wherein the first device is joined in the online session after the online meeting is over.

8. The server of claim 6, wherein the processor is further configured to:
- determine that a number of devices associated with the user account that are currently joined in the online meeting is less than a threshold,
- wherein the processor, when permitting the second device to join the online meeting, is configured to permit the second device to join the online meeting based on determining that the number of devices associated with the user account is less than the threshold.

9. The server of claim 6, wherein the processor is further configured to:
- update a number of devices associated with the user account that are currently joined in the online meeting based on permitting the first device to join the online meeting, and based on permitting the second device to join the online meeting.

10. The server of claim 6, wherein the processor is further configured to:
- receive a username and a password from the first device as the login information; and
- receive the username and the password from the second device as the login information.

11. A non-transitory computer-readable medium storing instructions, the instructions comprising: one or more instructions that, when executed by one or more processors of a server, cause the one or more processors to:
- permit a first device to join an online meeting held with at least a third device based on receiving a user input from the first device;
- permit a second device to join the online meeting in addition to the first device based on receiving login information associated with a user account used by the first device from the second device;
- provide, to at least the third device in the online meeting, screen information of the second device, after permitting the second device to join the online meeting;
- permit the first device to join an online session based on receiving the login information associated with the user account, wherein the online meeting is held with one or more devices joined in the online session;
- provide video information captured by a camera of the first device to other devices joined in the online session; and
- permit the second device to join the online meeting only if the first device is joined in the online meeting.

12. The non-transitory computer-readable medium of claim 11, wherein the one or more instructions cause the one or more processors to:
- permit the second device to join the online session based on receiving the login information when the second device is permitted to join the online meeting; and
- prevent the second device from joining the online session if the online meeting is over, wherein the first device is joined in the online session after the online meeting is over.

13. The non-transitory computer-readable medium of claim 11, wherein the one or more instructions cause the one or more processors to:
- determine that a number of devices associated with the user account that are currently joined in the online meeting is less than a threshold,
- wherein the one or more instructions, that cause the one or more processors to permit the second device to join the online meeting, cause the one or more processors to permit the second device to join the online meeting based on determining that the number of devices associated with the user account is less than the threshold.

14. The non-transitory computer-readable medium of claim 11, wherein the one or more instructions cause the one or more processors to:

update a number of devices associated with the user account that are currently joined in the online meeting based on permitting the first device to join the online meeting, and based on permitting the second device to join the online meeting.

\* \* \* \* \*